(12) United States Patent
Fischle

(10) Patent No.: US 11,555,736 B2
(45) Date of Patent: Jan. 17, 2023

(54) METHOD FOR CALIBRATING ONE OR MORE LOAD SENSORS IN A ROTOR BLADE OF A WIND TURBINE

(71) Applicant: Nordex Energy SE & Co. KG, Hamburg (DE)

(72) Inventor: Kurt Fischle, Lueneburg (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 17/505,289

(22) Filed: Oct. 19, 2021

(65) Prior Publication Data
US 2022/0120606 A1    Apr. 21, 2022

(30) Foreign Application Priority Data
Oct. 21, 2020   (EP) .................................... 20203107

(51) Int. Cl.
*G01G 23/01* (2006.01)
*F03D 17/00* (2016.01)
*F03D 7/02* (2006.01)

(52) U.S. Cl.
CPC ........... *G01G 23/01* (2013.01); *F03D 7/0224* (2013.01); *F03D 17/00* (2016.05); *F05B 2270/331* (2013.01)

(58) Field of Classification Search
CPC .... F03D 17/00; F03D 7/0224; F05B 2260/80; F05B 2260/84; F05B 2270/331; G08B 21/18; G01G 23/01
See application file for complete search history.

(56) References Cited

U.S. PATENT DOCUMENTS

| 8,157,522 B2 | 4/2012 | Bolz |
| 8,702,388 B2 | 4/2014 | Alvaro et al. |

(Continued)

FOREIGN PATENT DOCUMENTS

| EP | 2 047 098 B1 | 5/2013 | |
| EP | 2765307 A1 * | 8/2014 | ............ F03D 17/00 |

(Continued)

OTHER PUBLICATIONS

Guan, Hai-fang et al. "Calibration Method and Device of Optical Fibre Load Sensor of Wind Generating," Jul. 7, 2018, CNIPA, pp. 8-11 (Year: 2018).*

*Primary Examiner* — Brian P Wolcott
*Assistant Examiner* — Joshua R Beebe
(74) *Attorney, Agent, or Firm* — Walter Ottesen, P.A.

(57) ABSTRACT

A method calibrates a load sensor in a rotor blade of a wind turbine. The method includes checking a state and/or operating parameters of the wind turbine; continuously measuring a calibration condition for the wind turbine and comparing the measured calibration condition with predefined calibration prerequisites; switching to a calibration mode when the measured calibration condition meets the predefined calibration prerequisites or switching to a restricted production mode when the measured calibration condition does not meet the predefined calibration prerequisites; and, collecting measurement data in the calibration mode. The calibration mode is terminated when the required data have been collected for the calibration; and, switched from the calibration mode to an interruption mode. The mode is switched from the interruption mode to the restricted production mode when the measured calibration condition does not meet the predefined calibration prerequisites for longer than a predefined period of time.

13 Claims, 3 Drawing Sheets

(56) References Cited

U.S. PATENT DOCUMENTS

| | | | |
|---|---|---|---|
| 9,004,862 B2 | 4/2015 | Miranda | |
| 9,353,727 B2 | 5/2016 | Slot | |
| 9,645,034 B2 | 5/2017 | Eden | |
| 2017/0292501 A1 | 10/2017 | Perley et al. | |

FOREIGN PATENT DOCUMENTS

| | | | | |
|---|---|---|---|---|
| EP | 2 615 303 B1 | 12/2014 | | |
| EP | 2 547 905 B1 | 2/2015 | | |
| EP | 2 531 722 B1 | 8/2019 | | |
| WO | WO-2011092032 A1 * | 8/2011 | ............. | F03D 1/065 |
| WO | 2012000505 A2 | 1/2012 | | |
| WO | WO-2017000948 A1 * | 1/2017 | ............. | F03D 13/35 |

\* cited by examiner

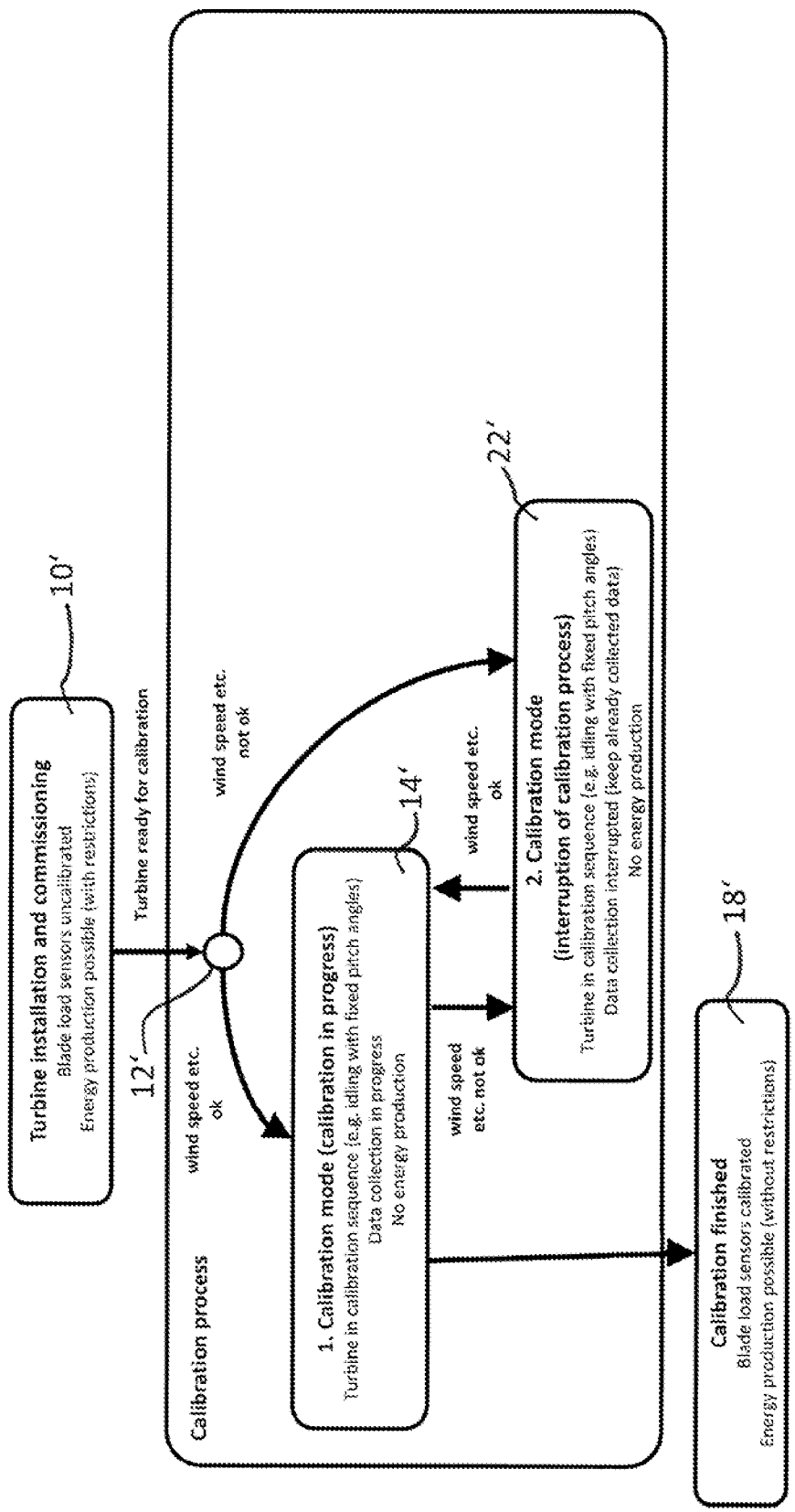

METHOD FOR CALIBRATING ONE OR MORE LOAD SENSORS IN A ROTOR BLADE OF A WIND TURBINE

CROSS REFERENCE TO RELATED APPLICATION

This application claims priority of European patent application no. 20 203 107.6, filed Oct. 21, 2020, the entire content of which is incorporated herein by reference.

TECHNICAL FIELD

The present disclosure relates to a method for calibrating one or more load sensors in a rotor blade of a wind turbine.

BACKGROUND

Wind turbines include a rotor, the rotor hub of which is typically provided with three rotor blades. The rotor blades take power from the incoming wind and drive an electrical generator via a drive train with or without a gearbox, which generator generates electrical power and feeds the same into the electrical power grid.

Wind turbines have a so-called pitch system for each rotor blade, via which the rotor blade can be rotated about its longitudinal axis. When the wind turbine is equipped with individual pitch control (IPC), the pitch angle of each rotor blade can be set independently of the other rotor blades. The bending moments acting on the rotor blade during operation can be resolved in two main directions. In the case of the bending moment in the flapwise direction, a positive moment occurs when the blade tip is bent toward the pressure side. A negative moment is considered to occur when the blade tip is bent toward the suction side. In the case of the bending moment acting in the edgewise direction, the moment is considered positive when the blade tip bends toward the leading edge and negative when the blade tip bends toward the trailing edge of the rotor blade. Load sensors typically attached in the region of the rotor blade root can be used to measure these moments. It is thereby important to work with calibrated sensors that not only measure a relative change in the loads on the rotor blade, but that also make it possible to assign a direction and magnitude to the moments.

A measuring system connected to the load sensors is also referred to as a rotor blade load (RBL) sensor system. Monitoring the moments on the rotor blades produces a series of advantages. For example, rotor blade vibrations can also be monitored or loading caused by extreme gusts of wind can be prevented via a common adjustment of the pitch angles (EGLM=extreme gust load mitigation).

U.S. Pat. No. 9,353,727 discloses a calibration method in which a rotor azimuth angle and a pitch angle are determined for a first rotor blade, the loads being measured in a first cross-section of the first rotor blade via a first load sensor. The theoretical loads are determined based on the rotor azimuth angle and the pitch angle. The measured loads are compared with the theoretically determined loads. This known method makes it possible to calibrate the sensors during operation when the rotor blades are installed, in particular while the wind turbine is connected to the electrical power grid.

US 2017/0292501 A1 discloses a method for automatically calibrating a load sensor of a wind turbine. During calibration, a large number of sensor signals are recorded, the recorded values being compared with a load estimation. Proceeding from this comparison, the data are evaluated in order to ascertain whether the load sensors are functioning correctly. A statistical correlation between the measured values and the values determined in the model is used to calibrate the parameters.

U.S. Pat. No. 8,702,388 discloses a calibration method for load sensors in the rotor blades of a wind turbine. In the method, the generator of the wind turbine is operated in motor mode in order to shift the rotor and thus the rotor blades into a predetermined defined state in which the values of the load sensors are recorded for calibration.

U.S. Pat. No. 8,157,522 discloses a calibration method for a wind turbine that can be carried out automatically. Strain gauges are used on the inner wall of the rotor blade in the cylindrical portion of the rotor blade, in the vicinity of the blade flange. The measured values for the measuring system to be calibrated are recorded in the horizontal position of the rotor blade for different pitch angles. The acting moments are produced by the dead weight and weight distribution of the rotor blade.

U.S. Pat. No. 9,004,862 discloses a method for calibrating load sensors of a wind turbine, the method including the steps of carrying out a predetermined pitch movement for at least one rotor blade and recording the values measured by the load sensors. By comparing with predefined parameters, the calibration of the load sensors can be adapted as required. In particular, it is proposed to repeat the rotor blade adjustment process multiple times.

U.S. Pat. No. 9,645,034 discloses a method for operating a wind turbine, in which the wind turbine is rotated with its rotor without or with little wind loading in order to calibrate the sensor. In the process, the load values are recorded and used for calibration. This calibration takes advantage of the fact that, in the case of a rotor with a horizontal axis, the weight of the rotor blade and the weight forces that arise as a result lead to loading that is detected by the load sensor, no loading occurring as a result of a weight force when a rotor blade is vertical, that is, in the 6 o'clock or 12 o'clock position, but the loading of the weight forces being at their highest in the horizontal position of the rotor blade, that is, in the 3 o'clock or 9 o'clock position. By virtue of this load measurement, zero crossings of the load signal can be detected and assigned. The weight load of a rotor blade is typically known and can therefore be used for qualitative assignment.

SUMMARY

It is an object of the invention to provide a method for calibrating one or more load sensors in a rotor blade of a wind turbine. The method makes it possible to calibrate the load sensors with simple means and with as little as possible production downtime.

A method is provided and intended as a working method via which measurement data from load sensors can be collected and evaluated for calibrating the load sensors. The wind turbine includes a rotor having a rotor hub and at least one rotor blade. In the method, state and/or operating parameters of the wind turbine are checked in order to ascertain whether calibration is permissible. Furthermore, in the method, at least one calibration condition for the wind turbine is measured continuously and compared with one or more predefined calibration prerequisites. Via this continuous measurement step, it is ensured that the measurement data are only collected if the at least one calibration condition for the wind turbine exists. Therefore, no measurement data are collected for the evaluation if one or more predefined calibration prerequisites are not met.

In the method, mode is switched to calibration mode if the at least one measured calibration condition meets the one or more predefined calibration prerequisites. Furthermore, mode is switched to restricted production mode if the at least one measured calibration condition does not meet the one or more predefined calibration prerequisites. The method therefore switches to calibration mode or to restricted production mode depending on whether or not the at least one measured calibration condition meets the one or more predefined calibration prerequisites. If the method has switched to calibration mode, measurement data are collected for as long as the at least one measured calibration condition meets the one or more predefined calibration prerequisites. Therefore, measurement data are collected provided that the one or more predefined calibration prerequisites are met. Calibration mode is normally terminated when the required data have been collected for the calibration process.

According to the disclosure, mode is switched from calibration mode to interruption mode, in which the collection of measurement data is interrupted if the at least one measured calibration condition does not meet the one or more predefined calibration prerequisites. Mode is switched from interruption mode to restricted production mode if the at least one measured calibration condition does not meet the one or more predefined calibration prerequisites for longer than a first predefined period of time. A special aspect of the method according to the disclosure is the interruption mode, in which, when following the calibration mode, the collection of measurement data is interrupted. The wind turbine only switches to restricted production mode if the collection of measurement data has been interrupted for longer than the first predefined period of time. Interruption mode has the advantage that operation is only switched from calibration mode to restricted production mode if the at least one measured calibration condition does not meet the one or more predefined calibration prerequisites for a certain period of time. Only the collection of measurement data is interrupted prior to the switch to restricted production mode. The advantage of this is that, in the event of the interruption, the measurement data collected up to that point do not have to be discarded, but rather can be evaluated further. In this way, the calibration process can be carried out much more quickly and the production downtimes arising during calibration can be reduced.

In an embodiment, mode is switched from restricted production mode to calibration mode if the at least one measured calibration condition meets the one or more predefined calibration prerequisites for more than a second predefined period of time. The second predefined period of time ensures that the situation is stable before the switch from restricted production mode to calibration mode.

Furthermore, in the method, mode is switched from interruption mode back to calibration mode if the at least one calibration condition meets the one or more predefined calibration prerequisites. The switching-back from interruption mode to calibration mode may also be delayed, in that the at least one measured calibration condition meets the one or more predefined calibration prerequisites for a third predefined period of time. However, it is also possible to switch back from interruption mode to calibration mode without a time delay. The advantage of immediately switching back to calibration mode is that the period of time in which the collection of measurement data is interrupted can be kept as short as possible. This increases the consistency of the measurement data collected and enables more precise and more reliable calibration of the load sensors.

In an embodiment, after exiting calibration mode, that is, when the required measurement data have been collected for calibration, the measurement data are evaluated, which involves determining the calibration parameters for the one or more load sensors.

In an embodiment, unrestricted production mode, that is, production mode in which the forces and moments acting on the rotor blade or blades are not limited, is permitted with calibrated sensors, because uncalibrated load sensors do not provide exact measurement results for the acting forces and moments.

For the practical application of the method, it has been shown that the measured wind speed constitutes an adequate calibration condition that allows for reliable evaluation of the measurement data in a wide variety of other situations as well. A maximum wind speed is in this case provided as a predefined calibration prerequisite. If the measured wind speed is less than the maximum wind speed, the measurement data can be collected. If the wind speed is not less than the maximum wind speed from the predefined calibration prerequisite, the collection of measurement data is initially interrupted and operation is only switched to restricted production mode if the maximum wind speed is exceeded for a prolonged period of time. Of course, if the wind speed is used as the calibration condition and the predefined calibration prerequisite, it is naturally possible to use weighted, averaged, smoothed or otherwise preprocessed wind speed values. Equally, the distinction between greater than or greater than or equal to is inconsequential to the implementation of the method, since the value itself may be on one or the other side of the comparison.

According to an embodiment, a maximum power and/or maximum rotational speed is specified for the wind turbine in restricted production mode. By virtue of a restrictive specification of this kind, it is ensured that lacking or inaccurate values from the load sensors in the rotor blades do not lead to undetected overloading of the rotor blades during operation of the wind turbine.

In an embodiment, the wind turbine is started for a switch to restricted production mode. The wind turbine is stopped for a switch to calibration mode. However, when switching between calibration mode and interruption mode, only the collection of measurement data is stopped or started. This is a purely data-related function that does not require the wind turbine to be started up or shut down. Calibration mode and interruption mode take place, for example, during idling mode, in which the wind turbine is not ready to feed power into the electrical power grid and the generator of the wind turbine, for example, is not connected to the electrical power grid. Therefore, for a switch to restricted production mode, it is necessary to carry out a self-test of the wind turbine, increase the rotational speed of the rotor and couple the wind turbine to the electrical power grid. This process lasts 3 to 5 minutes. Equally, when switching to calibration mode, it is necessary to reduce the rotational speed and disconnect the wind turbine from the electrical power grid.

For calibration mode, measurement values for one or more predefined pitch angles of the rotor blade/s can be recorded at one or more revolutions of the rotor. Rotation in this case takes place about the horizontal axis about which the rotor hub of the wind turbine rotates. It has proven favorable to measure two or more revolutions of the rotor for two significantly different pitch angles of the rotor blade.

BRIEF DESCRIPTION OF THE DRAWINGS

The invention will now be described with reference to the drawings wherein.

DESCRIPTION OF THE PREFERRED EMBODIMENTS

In the presentation of the disclosure, we have assumed that a person skilled in the art is familiar with a method for calibrating load sensors in the rotor blades of a wind turbine. The key concept of any calibration method is that the center of gravity and position of the sensors relative to the center of gravity is known for the rotor blade. Taking into account the force of gravity and potentially taking into account acting wind loads, it is possible to determine what bending moments are being applied to the rotor blade. These bending moments can be related to the detected measurement signals of the load sensors. In this way, it is possible to reliably assign the measurement data from the load sensors to the forces and moments applied to the rotor blade. This process is called calibration.

In the case of a wind turbine, calibration is not only necessary during first commissioning of the wind turbine. Recalibrations may frequently be required for the wind turbine if, for example, a load sensor for the rotor blade is replaced, the rotor blade itself is replaced or if the assignment for the blade pitch angle is changed by more than 0.5°.

In the case of calibration, the rotor of the wind turbine is rotated by two revolutions at a wind speed of less than 8 m/s, preferably less than 4 m/s, and a relative wind direction of less than +/−30° in a first pitch position of the rotor blade, for example in the range of from 40° to 55° or from 45° to 60°. Subsequently, the rotor is driven again by the wind for at least two revolutions at a rotor blade pitch angle of 80°. The measured load signals are recorded and used for calibration. It is also possible to check the calibration thus found by bringing the rotor blade, in terms of the pitch angle thereof, into an angular position between the two measuring positions and checking the calibration parameters already found for two or more revolutions of the rotor. Depending on the result of this check, the calibration parameters can be discarded or corrected. Depending on the situation at hand, the calibration of this kind lasts for half an hour or more, such that, during this entire time, a low wind load should be applied if possible, such that the calibration results are not distorted.

Figure 1:
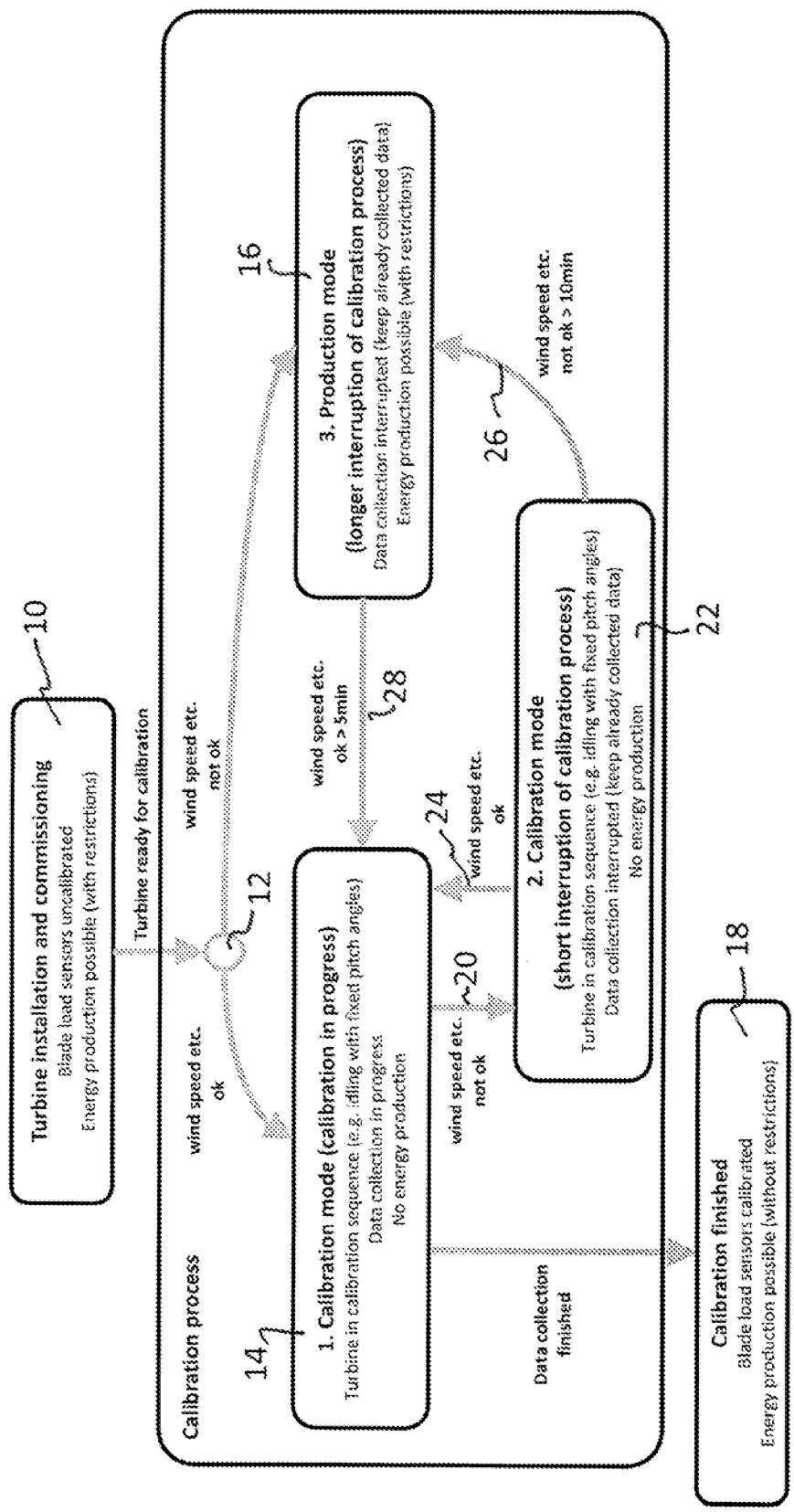
FIG. 1 is a block diagram for the method according to the disclosure.

The sequence shown in FIG. 1 relates to a first installation of the wind turbine, a state in which the load sensors have yet to be calibrated. For safety reasons, it is only possible to operate the wind turbine at reduced power in this state. In a subsequent step, it is checked whether the load sensors in the rotor blades of the wind turbine can be calibrated. Prerequisites herefor are, for example, that no manual stop is provided for the wind turbine or that there are other state and/or operating parameters preventing starting operation of the wind turbine.

If the wind turbine is in a state in which the load sensors can be calibrated, in a first state 12, a check is made as to whether the wind speed is greater than a predefined maximum wind speed. For example, the maximum wind speed may be set at 9 m/s, preferably 6 m/s. If the wind speed is below the maximum wind speed, the wind turbine switches to calibration mode 14. If the wind speed is greater than or equal to the maximum wind speed, the wind turbine switches to restricted production mode 16. In restricted production mode 16, no new measurement data are collected from the measuring sensors, but any measurement data already collected are retained. In restricted production mode 16, electrical power can be generated and fed into the electrical power grid. However, the production mode is restricted in the sense that the energy generation of the wind turbine is limited in terms of the electrical power fed in and/or the rotational speed of the wind turbine.

In calibration mode 14, measurement data are collected automatically. Here, in the case of a predefined fixed pitch angle of the rotor blade, for example, the measurement data of the load sensors are recorded for one or more revolutions of the rotor of the wind turbine. In this state, the wind turbine generates no energy or generates a wholly negligible amount thereof. The lacking or limited energy generation reduces the influence of wind power and production operation on the rotor blades.

Once the intended measurement data have been collected, in state 28, the data recording can be stopped and the load sensors can be calibrated. Energy generation without restrictions as in restricted production mode 16 is possible.

In calibration mode 14, the wind speed is measured continuously. If the wind speed is greater than the maximum wind speed, the wind turbine switches to interruption mode 22, which differs from calibration mode 14 in that no measurement data are collected. Calibration mode 14 is therefore interrupted. As with calibration mode 14, no energy or at most a small amount of energy is generated in interruption mode 22. If the wind speed returns to a value range which satisfies the predefined calibration prerequisites, that is, the wind speed is less than 9 m/s, for example, preferably less than 6 m/s, the wind turbine returns to calibration mode 14 in state 24. Measurement data are collected again in calibration mode 14. If the wind turbine cannot return to calibration mode 14 for more than a first predefined period of time, for example 15 minutes, preferably 10 minutes, the wind turbine switches to restricted production mode 16. In this mode, the measurement data collected thus far are retained and a limited amount of power is fed to the electrical power grid. If, during restricted power mode, the wind speed is within the range of the predefined calibration prerequisite for more than a second period of time, for example 8 minutes, preferably 5 minutes, the wind turbine switches back to calibration mode 14 in order to complete the measurement data for the calibration process 18.

Figure 2:
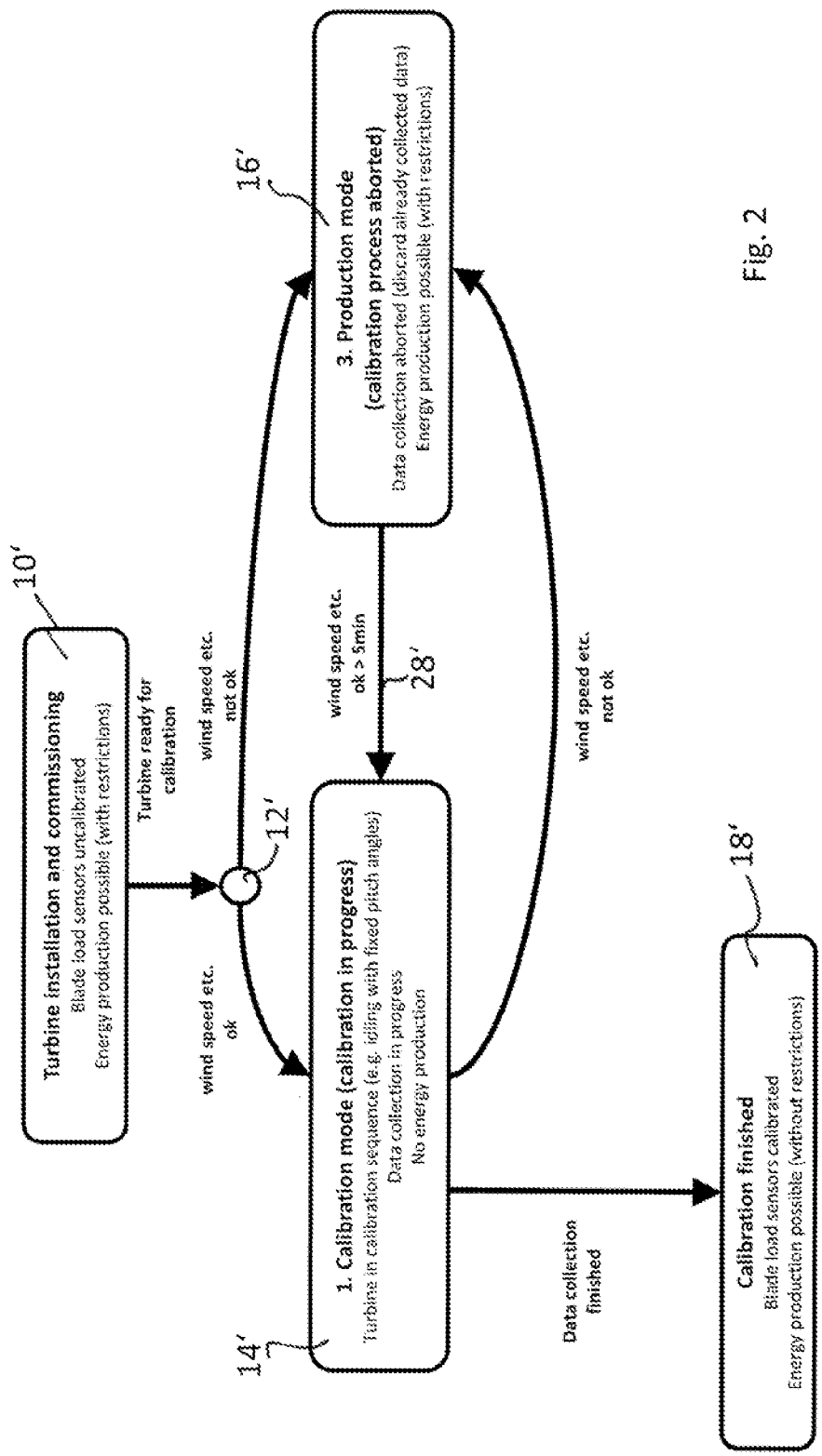
FIG. 2 is a block diagram for a first alternative shown for comparative purposes; and, FIG. 3 shows a second alternative for comparative purposes.

An advantage of the method is made clear by a comparison with the calibration processes in FIGS. 2 and 3. FIGS. 2 and 3 show calibration processes for comparative purposes. For better comparability, the reference numbers from FIG. 1 are shown as crossed-out reference numbers in the variants from FIGS. 2 and 3. The alternative method in 10' also starts in a wind turbine in which the load sensors are yet to be calibrated. In 12', the wind speed is requested and, depending on the wind speed measured, operation is switched either to calibration mode 14' or restricted production mode 16'. The difference becomes clear when considering the situation in calibration mode 14', in which the wind speed is no longer low enough to allow for calibration. In this case, the wind turbine switches to restricted production mode 16'. In state 28', the wind turbine switches back from restricted production mode 16' to calibration mode 14' if the wind speed permits calibration mode for a predefined period of time of more than 5 minutes. The disadvantage of the method from FIG. 2 is that the wind turbine has to be stopped and restarted in order to switch to restricted production mode 16'. In contrast, interruption mode according to the disclosure allows for the data recording to be continued immediately once the calibration conditions have been met once more.

FIG. 3 shows a variant in which it is only possible to switch between calibration mode 14' and interruption mode 22'. In this embodiment, the situation may arise in which the data collection in calibration mode 14' is interrupted if the calibration conditions do not permit calibration mode 14' for a relatively long period of time. During interruption of calibration mode 14' and the change into interruption mode 22' no energy production takes place. Only the combination of the methods from FIG. 2 and FIG. 3 produces the advantages according to the disclosure.

It is understood that the foregoing description is that of the preferred embodiments of the invention and that various changes and modifications may be made thereto without departing from the spirit and scope of the invention as defined in the appended claims.

LIST OF REFERENCE NUMBERS

10 Wind turbine
10' Wind turbine
12 State
12' State
14 Calibration mode
14' Calibration mode
16 Production mode
16' Production mode
18 Calibration process
22 Interruption mode
22' Interruption mode
24 State
28 State
28' State

What is claimed is:

1. A method for calibrating one or more load sensors in a rotor blade of a wind turbine including a rotor having a rotor hub and at least one rotor blade, the method comprising:
checking at least one of state and operating parameters of the wind turbine to ascertain whether calibration is permissible; continuously measuring at least one calibration condition for the wind turbine and comparing the at least one measured calibration condition with one or more predefined calibration prerequisites; switching to a calibration mode when the at least one measured calibration condition meets the one or more predefined calibration prerequisites or switching to a restricted production mode when the at least one measured calibration condition does not meet the one or more predefined calibration prerequisites, wherein, in the restricted production mode, energy generation of the wind turbine is limited by at least one of:
power fed into the grid and rotational speed of the wind turbine;
collecting measurement data in the calibration mode for as long as the at least one measured calibration condition meets the one or more predefined calibration prerequisites, wherein the calibration mode is terminated when the required data have been collected for the calibration;
and, switching from the calibration mode to an interruption mode, in which the collection of measurement data is interrupted, when the at least one measured calibration condition does not meet the one or more predefined calibration prerequisites, wherein mode is switched from the interruption mode to the restricted production mode when the at least one measured calibration condition does not meet the one or more predefined calibration prerequisites for longer than a first predefined period of time.

2. The method of claim 1, wherein the mode is switched from the restricted production mode to the calibration mode when the at least one measured calibration condition meets the one or more predefined calibration prerequisites for more than a second predefined period of time.

3. The method of claim 1, wherein the mode is switched from the interruption mode back to the calibration mode when the at least one measured calibration condition meet the one or more predefined calibration prerequisites.

4. The method of claim 1, wherein after the calibration mode has ended, the measurement data are evaluated in order to calibrate the one or more load sensors.

5. The method of claim 1, wherein an unrestricted production mode is possible with calibrated load sensors.

6. The method of claim 1, wherein a value for a measured wind speed is provided as a calibration condition.

7. The method of claim 6, wherein a value for a maximum wind speed is provided as a predefined calibration prerequisite.

8. The method of claim 1, wherein at least one of maximum power and maximum rotational speed for the wind turbine are provided in the restricted production mode.

9. The method of claim 1, wherein the wind turbine is started for a switch to the restricted production mode.

10. The method of claim 1, wherein the wind turbine is stopped for a switch from the restricted production mode to the calibration mode.

11. The method of claim 1, wherein the wind turbine continues operating and the collection of measurement data is turned on or off for a switch between the calibration mode and the interruption mode.

12. The method of claim 1, wherein measurement data of the one or more load sensors for one or more predefined pitch angles of the rotor blade are recorded at one or more revolutions of the rotor of the wind turbine in the calibration mode.

13. The method of claim 3, wherein the switching back from interruption mode to calibration mode may also be delayed, in that the at least one measured calibration condition meets the one or more predefined calibration prerequisites for a third predefined period of time.

* * * * *